United States Patent [19]

Lucey

[11] Patent Number: 4,514,468
[45] Date of Patent: Apr. 30, 1985

[54] ELECTRONIC COMPONENT WITH UV-CURED COATING

[75] Inventor: Michael F. Lucey, North Adams, Mass.

[73] Assignee: Sprague Electric Company, North Adams, Mass.

[21] Appl. No.: 498,374

[22] Filed: May 26, 1983

[51] Int. Cl.³ .............................. C08F 8/00; B29C 5/00
[52] U.S. Cl. .................................... 428/418; 428/458; 427/54.1
[58] Field of Search .................. 428/458, 412, 418; 427/54.1

[56] References Cited

U.S. PATENT DOCUMENTS

| | | | |
|---|---|---|---|
| 3,156,580 | 11/1964 | Howard | 428/418 X |
| 3,509,086 | 4/1970 | Rohrbacher, Jr. | 428/418 X |
| 3,989,610 | 11/1976 | Tsukada et al. | 427/54.1 X |
| 3,990,395 | 11/1976 | Evans et al. | 118/642 |
| 3,992,276 | 11/1976 | Powanda et al. | 428/458 X |
| 4,039,905 | 8/1977 | Pearce et al. | 361/433 |
| 4,073,835 | 2/1978 | Otsuki et al. | 264/22 |
| 4,111,770 | 9/1978 | Najnar | 427/54.1 X |
| 4,146,916 | 3/1979 | Breeden et al. | 361/433 |
| 4,282,269 | 8/1981 | Lucey | 427/54.1 |

Primary Examiner—George F. Lesmes
Assistant Examiner—Nancy A. B. Swisher

[57] ABSTRACT

An electronic component is directly coated with the ultraviolet-light cured product of an epoxy acrylate and a cycloaliphatic methacrylate.

6 Claims, 3 Drawing Figures

ELECTRONIC COMPONENT WITH UV-CURED COATING

BACKGROUND OF THE INVENTION

This invention relates to an electronic component which has an ultraviolet-light cured coating directly against it obtained from a bisphenol A epoxy diacrylic resin and a cycloaliphatic methacrylate. A wetting agent, adhesion agent, photoinitiator and a peroxide are also present in the preferred embodiments of this invention. A different conformal coating may optionally be added on top of the uv-cured coating. The electronic component for which the coating of this invention is especially adapted is a multilayer film capacitor.

Coatings which are cured by ultraviolet light have been used in the prior art as bands holding rolled sections in place, as capacitor can coatings, as end seals and on a capacitor section itself. Each of these prior art uses has required different formulations as the requirements for each differ. For example, a coating used to contain an electrolyte must be resistant to the electrolyte components, particularly the solvent, while one used to coat a component to be used on circuit boards must be resistant to different, aqueous flux solvents.

SUMMARY OF THE INVENTION

This invention features an electronic component directly coated with an ultraviolet-light cured material obtained from a bisphenol A epoxy diacrylate and cycloaliphatic methacrylate. A photoinitiator, an adhesion agent, a peroxide and a wetting agent are also included. The component is preferably a film capacitor, and specifically, a rectangular multilayer film capacitor.

This rectangular shape, with its plurality of straight edges and corners, is difficult to coat because the coating tended to pull away from these edges and corners or cracks upon or shortly after curing. Since these components are made for use with circuit boards, two layers of coating are preferred in case of pinholes in one layer through which aqueous fluxes could seep and ruin the capacitor. However, it is desirable that each layer be relatively thin, both for ease of application and curing and also so that the coated component will be only slightly larger than an uncoated one.

The components of the coating of the present invention were chosen to give an uncured mixture of the desired viscosity so that, aided by the wetting and adhesion agents, the coating would cover straight edges and corners without pulling away and yet be thin enough so that two coats could be used without substantially increasing the size of the component. The cured coating must also be compatible with the component and resistant to aqueous fluxes, some of which will dissolve metallization from metallized film layers.

A bisphenol A epoxy diacrylate is one major component of the coating and a cycloaliphatic methacrylate, specifically cyclohexyl methacrylate, is the other major component.

DESCRIPTION OF THE PREFERRED EMBODIMENTS

Figure 1:
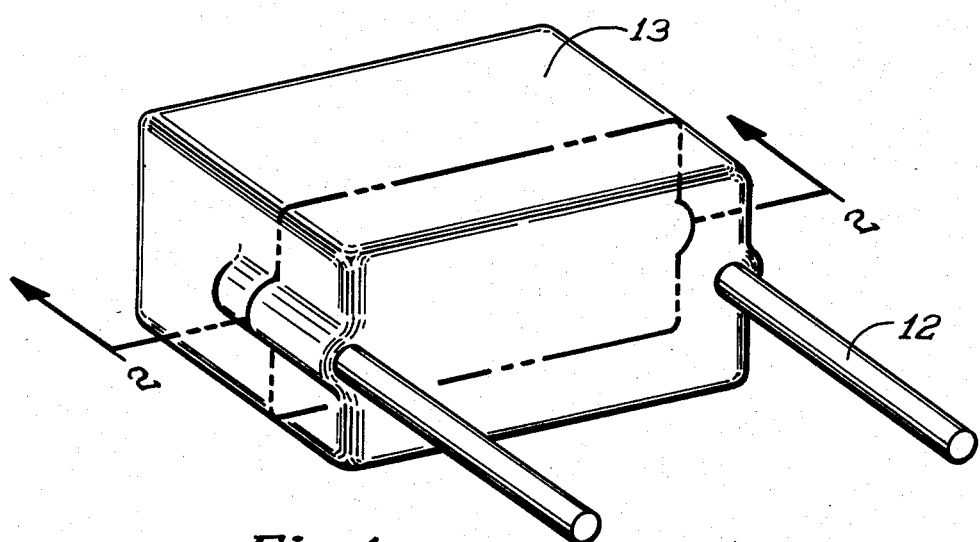
FIG. 1 is a perspective view of a coated component of the present invention.
Figure 2:
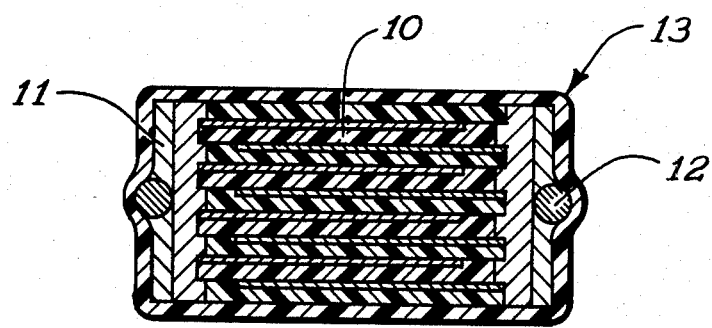
FIG. 2 is a cross-section taken along the line 2—2 of the coated component of FIG. 1.
Figure 3:
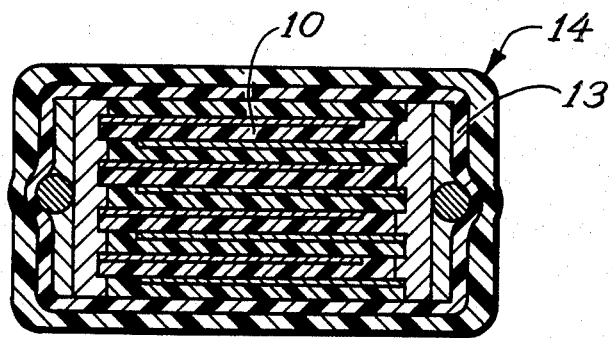
FIG. 3 is a cross-section of a different embodiment of the present invention utilizing an outer coating over the component of FIG. 2.

While a variety of components, especially metallized film capacitors, can be coated with the coating of the present invention, FIG. 1 depicts one of them, a multilayer film capacitor as component 10 with metallization 11 to which leads 12 are attached. It has a uv-cured coating 13 directly over the component 10 covering all of it and a portion of leads 12. This coating 13 is obtained from a bisphenol A epoxy diacrylate and a cycloaliphatic methacrylate. Optionally, as shown in FIG. 3, a different coating 14, preferably a thermally cured epoxy, is placed over uv-cured coating 13.

Coating 13 is prepared by blending the epoxy diacrylate with the methacrylate and adding a photoinitiator, a peroxide, a wetting agent and an adhesion monomer. When component 10 is a multilayer film capacitor as shown, the coating is applied by dipping the capacitor into the coating mixture, and then the component and coating are exposed to an ultraviolet light for up to 60 seconds to cure the coating. A second layer, if desired, is applied by redipping followed by curing. If a top coating 14 is desired, as shown in FIG. 3, it is applied preferably by immersing the coated unit in a fluidized bed of epoxy resin which is then thermally cured. This outer coating 14 contains a dye while coating 13 preferably does not. When the component 10 is a different type of capacitor, e.g., an axial lead capacitor, coating 13 may be applied by other known methods such as roll coating, spraying, etc.

The particular methacrylate reactive diluent was found to affect completeness of curing as hydroxy methacrylates seem to be air inhibited, that is they would not cure completely in the presence of air. While the uv-cured coating alone appeared fine, when the coated units were dipped into the fluidized bed of epoxy resin to put on the outer coat, the surface became tacky and bubbles were formed along the top surface giving a poor coating. It is not known whether this bubble formation indicated an incomplete uv-cure, a chemical reaction with the epoxy, or some combination thereof. However, it was undesirable. Dimethacrylates, di- and tri-acrylates caused cracking at corners or along edges. Aliphatic methacrylates did not provide low enough vapor transmission levels to be acceptable.

The preferred cycloaliphatic methacrylate, cyclohexyl methacrylate, did not give this bubble formation and did provide adherence to edges and corners. Other cycloaliphatic methacrylates are considered to be within the scope of this invention subject to their commercial availability and compatability with the capacitor materials.

The epoxy diacrylate used in the following example was Celrad 3701 obtained from the Celanese Plastics & Specialties Co. of Louisville, KY. A wetting agent, if used, is a fluorinated hydrocarbon FC-430 obtained from the 3M Co., Commercial Chemicals Div., St. Paul, MN. The photoinitiator is 2,2-dimethoxy-2-phenylacetophenone, the adhesion monomer is an allylic ureide DV-1246 obtained from Alcolac of Baltimore, MD, and the peroxide is preferably di-tert-.butyl peroxide or tert.butyl peroctoate.

EXAMPLE 1

One set each of multilayer film capacitors were completely dipped in two different formulations, one containing 59.0 wt.% bisphenol A epoxy diacrylate and 34.8 wt.% cyclohexyl methacrylate plus about 0.2% wetting agent, about 2.0% adhesion agent, about 2.0% photoinitiator, and about 2.0% tert.butyl peroctoate. The second contained 51.4% of the epoxy diacrylate and 44.4% of the methacrylate plus about the same amounts of the wetting agent, adhesion agent, photoinitiator but no peroxide. The coatings were cured by approximately one minute exposure to uv-light and placed in an oven at 120° C. overnight as a screening test. There were no cracks or splitting of the coating.

EXAMPLE 2

Three sets of capacitors were subjected to controlled humidity tests and four sets to sequential, harsh "pickle jar" tests. In the controlled humidity test, units were placed in an oven in a controlled atmosphere of 90–95% humidity at 40° C. for 500 hrs. In the pickle jar tests, the units are placed in jars containing water but above the water line, and the jars are placed in an oven at 75° C. and 85° C. The units are bathed in liquid condensate during the test. The units were rated at 0.47μF, 100V, and failure levels are 0.2μA maximum 100V leakage current (DCL), 1.3% maximum dissipation factor (% df), and −5% maximum change in capacitance (%ΔC). In the table below, A stands for units coated at ambient conditions, V for those coated under vacuum conditions, AP for those coated at ambient conditions plus a powder epoxy topcoat, and VP, vacuum coated plus topcoat. All units were cured by exposure to 1500 W u-v light for up to one minute and then topcoats, if any, were applied and thermally cured at 120° C. Average results are given.

TABLE

| Units | Controlled Humidity | | | 72 hr, % df | 75° C. DCL | Pickle Jar % ΔC | 350 hr, % df | 85° C. IR | Pickle Jar % ΔC |
| | % df | IR | % ΔC | | | | | | |
| --- | --- | --- | --- | --- | --- | --- | --- | --- | --- |
| A | — | — | — | 0.59 | 0.0071 | +5.5 | 0.79 | 0.013 | −0.44 |
| V | 0.52 | 0.002 | +4.7 | 0.59 | 0.0052 | +6.0 | 0.71 | 0.0097 | +3.6 |
| AP | 0.48 | 0.002 | +4.4 | 0.54 | 0.0034 | +5.3 | 0.61 | 0.17 | +6.4 |
| VP | 0.49 | 0.0019 | +4.2 | 0.53 | 0.0034 | +5.2 | 0.62 | 0.10 | +6.4 |

These data show the resistance of the uv-coating to moisture and high humidity conditions. The uv-coating contained 52.1% bisphenol A epoxy acrylate, 41.7% cyclohexyl methacrylate, 0.2% wetting agent, and about 2% each of adhesion agent, photoinitiator and peroxide.

EXAMPLE 3

This example shows the resistance of the coating to salt water and Loncoterge, an alkaline material used to wash circuit boards. The salt test involved heat soaking the coated units at 100° C. for 1 hr. and immediately immersing them in a 10% sodium chloride solution at 25° C. for 15 min. After the electrical properties were read, the units were heated at 100° C. and immersed in a Loncoterge solution at 60° C. The coating composition and failure levels were the same as in Example 2.

TABLE

| Units | Salt Test | | | Loncoterge | | |
| | % df | DCL | % ΔC | % df | DCL | % ΔC |
| --- | --- | --- | --- | --- | --- | --- |
| A | 0.49 | 0.0015 | −0.99 | 0.52 | 0.0016 | −0.99 |
| V | 0.47 | 0.0014 | −0.59 | 0.54 | 0.0017 | −0.55 |
| AP | 0.49 | 0.0013 | +0.10 | 0.54 | 0.0015 | +0.23 |
| VP | 0.49 | 0.0012 | +0.21 | 0.55 | 0.0016 | +0.38 |

The results show that the coated units are resistant to salt water and alkaline cleaning materials.

EXAMPLE 4

Two sets of units coated as above were subjected to thermal cycling five times at −55° C. to +125° C. followed by life testing at 85° C. and 150VDC for 250 hr. Failure levels are the same as above except that maximum capacitance change on life testing is ±10%.

TABLE

| Units | Thermal Cycle | | | Life Test | | |
| | % df | IR | % ΔC | % df | IR | % ΔC |
| --- | --- | --- | --- | --- | --- | --- |
| V | 0.51 | 0.0015 | −0.89 | 0.51 | 0.0009 | −1.63 |
| VP | 0.52 | 0.0017 | +0.15 | 0.51 | 0.0008 | −0.73 |

The units showed good electrical properties after thermal cycling and life testing.

While the above coating is the preferred composition, the amount of epoxy diacrylate can be varied between 51 and 59% with lower and higher amounts producing cracking, or the coating becomes too viscous for easy application. Similarly, the amount of methacrylate can vary between 34.8 and 44.4% with lower and higher amounts producing the reverse, i.e., too high a viscosity or cracking. The wetting agent should be as low as possible to give good adhesion, and the levels of photoinitiator, peroxide and adhesion agent should be approximately 2% each.

What is claimed is:

1. An electronic component having a coating of an ultraviolet light curable composition directly against said component, said coating consisting essentially of a completely ultraviolet light cured product obtained from a mixture of 51 to 59% of a bisphenol A epoxy diacrylate, 34.8 to 44.4% of a cycloaliphatic methacrylate, about 2% of a photoinitiator, about 2% of a peroxide, about 0.2% of a wetting agent, and about 2% of a wet adhesion monomer.

2. A component according to claim 1 wherein said methacrylate is cyclohexyl methacrylate.

3. A component according to claim 1 wherein said component is a metallized film capacitor.

4. A component according to claim 3 wherein said component is a multilayer metallized film capacitor.

5. A component according to claim 1 wherein said component is additionally coated with an outer conformal coating overlying said cured product.

6. A component according to claim 1 wherein said coating consists essentially of 52.1% of said epoxy diacrylate, 41.7% of said methacrylate, 0.2% of a fluorinated hydrocarbon as said wetting agent, 2% of 2,2-dimethoxy-2-phenylacetophenone as said photoinitiator, 2% of tert.butyl peroctoate as said peroxide, and 2% of an allylic ureide as said adhesion monomer.

* * * * *

UNITED STATES PATENT AND TRADEMARK OFFICE
CERTIFICATE OF CORRECTION

PATENT NO. : 4,514,468
DATED : April 30, 1985
INVENTOR(S) : Michael Lucey

It is certified that error appears in the above—identified patent and that said Letters Patent is hereby corrected as shown below:

Column 3, in the headings in the Table of Example 2,
        change "IR" (both occurrences) to -- DCL --
Column 4, in the headings in the Table of Example 4,
        change "IR" (both occurrences) to -- DCL --

Signed and Sealed this

Twenty-seventh Day of August 1985

[SEAL]

Attest:

DONALD J. QUIGG

Attesting Officer     Acting Commissioner of Patents and Trademarks